US008073427B2

(12) United States Patent
Koch et al.

(10) Patent No.: US 8,073,427 B2
(45) Date of Patent: Dec. 6, 2011

(54) REMOTELY REQUESTING AN ALERT FROM A LOST OR STOLEN WIRELESS DEVICE

(75) Inventors: Robert Koch, Norcross, GA (US); Michael Bishop, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 779 days.

(21) Appl. No.: 11/502,045

(22) Filed: Aug. 10, 2006

(65) Prior Publication Data

US 2006/0274683 A1 Dec. 7, 2006
US 2007/0064636 A9 Mar. 22, 2007

Related U.S. Application Data

(63) Continuation-in-part of application No. 10/881,669, filed on Jun. 30, 2004, now Pat. No. 7,849,161.

(51) Int. Cl.
*H04M 1/66* (2006.01)
(52) U.S. Cl. ............ 455/411; 455/414.1; 455/566; 455/404.1; 455/418; 340/568.1
(58) Field of Classification Search ........... 455/414, 455/556, 411, 404.1, 418, 456.1, 414.1; 340/568.1
See application file for complete search history.

(56) References Cited

U.S. PATENT DOCUMENTS

| | | | |
|---|---|---|---|
| 5,987,609 A | 11/1999 | Hasebe | 726/35 |
| 6,480,096 B1 | 11/2002 | Gutman et al. | 340/5.31 |
| 6,662,023 B1 * | 12/2003 | Helle | 455/558 |
| 7,024,698 B2 | 4/2006 | Tanaka et al. | 726/26 |
| 7,184,750 B2 | 2/2007 | Tervo et al. | 455/410 |
| 2002/0112046 A1 | 8/2002 | Kushwaha et al. | 709/223 |
| 2002/0137530 A1 * | 9/2002 | Karve | 455/466 |
| 2004/0084525 A1 * | 5/2004 | Kreiner et al. | 235/384 |
| 2004/0180673 A1 * | 9/2004 | Adams et al. | 455/456.2 |
| 2004/0203601 A1 | 10/2004 | Morriss et al. | 455/411 |
| 2005/0046580 A1 * | 3/2005 | Miranda-Knapp et al. | 340/686.1 |
| 2005/0096030 A1 * | 5/2005 | Boyd et al. | 455/419 |
| 2006/0031399 A1 | 2/2006 | Sherman et al. | 709/217 |
| 2006/0031541 A1 | 2/2006 | Koch et al. | 709/229 |

OTHER PUBLICATIONS

U.S. Final Office Action dated May 8, 2008 in U.S. Appl. No. 10/881,669.
U.S. Office Action dated Nov. 7, 2007 in U.S. Appl. No. 10/881,669.

* cited by examiner

*Primary Examiner* — Nick Corsaro
*Assistant Examiner* — Quan Hua
(74) *Attorney, Agent, or Firm* — Moazzam & Associates, LLC

(57) ABSTRACT

A wireless device may be alerted. For example, a message may be received from an invoking party and parsed for request data. Then a determination may be made as to whether identification data in the received message matches identification data resident in the wireless device. Next, the wireless device may be alerted when the received identification data matches the identification data resident in the wireless device and when the request data includes a request to alert the wireless device. A return message may be sent to the invoking party when the request data includes the request to alert the wireless device. The return message may indicate that the wireless device as been alerted. Alerting the wireless device may comprise causing the wireless device to perform a function configured to indicate to a subject that the wireless device has been lost.

13 Claims, 6 Drawing Sheets

REMOTELY REQUESTING AN ALERT FROM A LOST OR STOLEN WIRELESS DEVICE

RELATED APPLICATIONS

This patent application is a continuation-in-part of U.S. patent application Ser. No. 10/881,669, entitled "System And Methods For Remotely Recovering And Purging Data From A Wireless Device In A Communications Network," filed on Jun. 30, 2004 now U.S. Pat. No. 7,849,161 and assigned to the same assignee as this application. The aforementioned patent application is expressly incorporated herein by reference. Furthermore, this patent application is related to U.S. patent application Ser. No. 11/197,844, entitled "Methods And Systems For Remotely Recovering Security Data In A Wireless Device In A Communications Network," filed Aug. 5, 2005, assigned to the assignee of the present patent application and is expressly incorporated herein by reference.

BACKGROUND

Wireless devices for communicating and storing voice and data are becoming commonplace. Users of wireless communication devices are increasingly using their wireless devices to send electronic mail ("E-mail") as well as store personal data, such as contact lists, calendar information, to do lists, and other notes. Much of this data may be considered as private to a user (e.g., passwords, credit card or bank account numbers, telephone numbers, addresses, and calendar or schedule information. Undesirable consequences may result for the user if the wireless device is lost and falls into the wrong hands.

Many wireless communication devices permit the user to enable a software lock of the device, which prevents use of the device unless a password is entered, and thus protects user data. However, use of this locking feature typically requires additional steps that the user might otherwise not wish to take in operating their device, such as remembering and entering a multi-digit code every time the device is turned on or when an attempt is made to access the user's private data. As a result, the wireless device's locking feature is frequently unused. Moreover, if a device is stolen or lost, even if the locking feature is in place, the user suffers the inconvenience of losing his or her data and wondering if the device had been previously locked.

SUMMARY OF THE INVENTION

Consistent with embodiments of the present invention, systems and methods are disclosed for alerting a wireless device.

For example, a message may be received from an invoking party and parsed for request data. Then a determination may be made as to whether identification data in the received message matches identification data resident in the wireless device. Next, the wireless device may be alerted when the received identification data matches the identification data resident in the wireless device and when the request data includes a request to alert the wireless device. A return message may be sent to the invoking party when the request data includes the request to alert the wireless device. The return message may indicate that the wireless device as been alerted. Alerting the wireless device may comprise causing the wireless device to perform a function configured to indicate to a subject that the wireless device has been lost or mislaid.

It is to be understood that both the foregoing general description and the following detailed description are examples and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
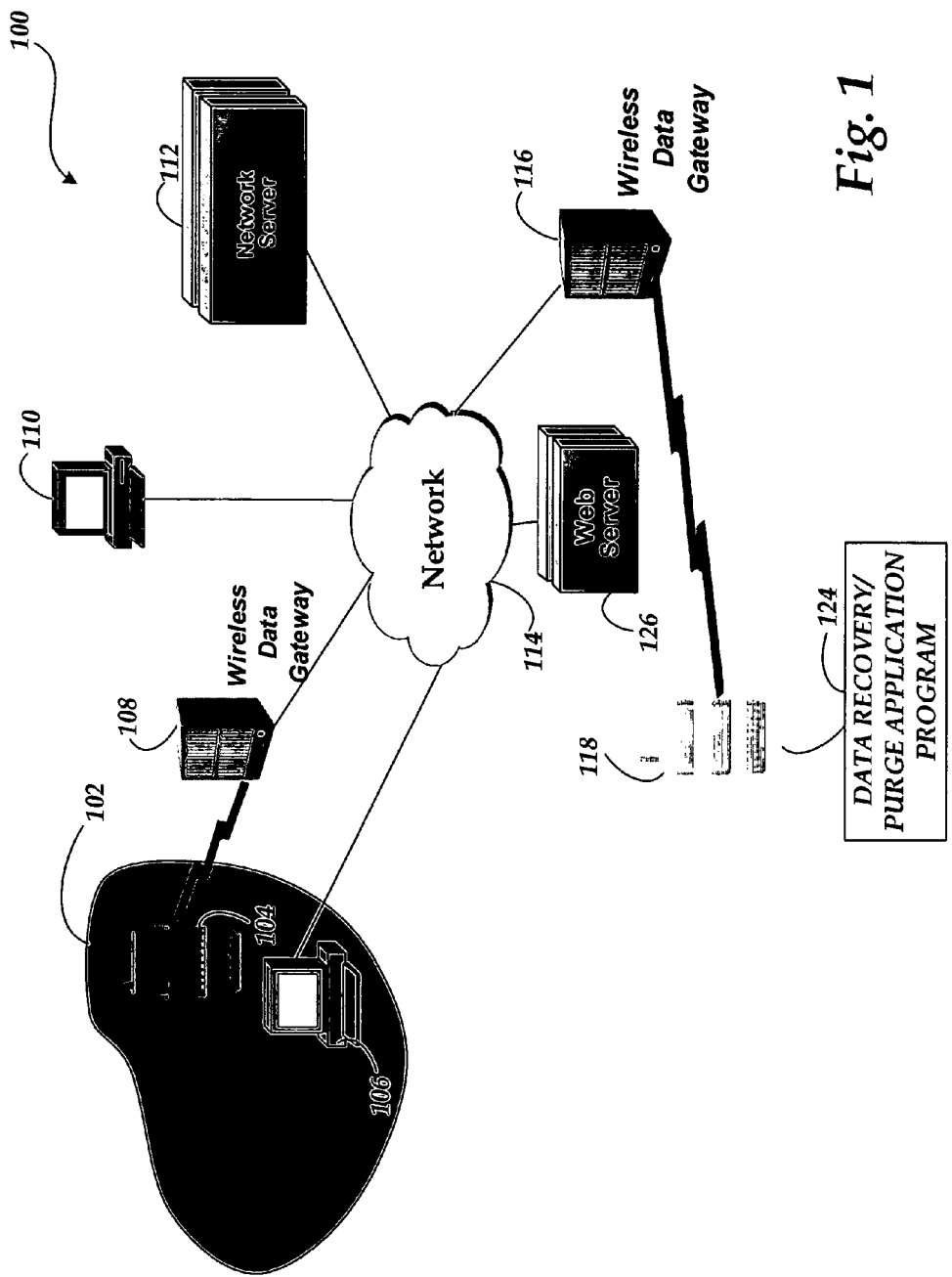
FIG. 1 is a network diagram illustrating aspects of a data communications network.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 2:
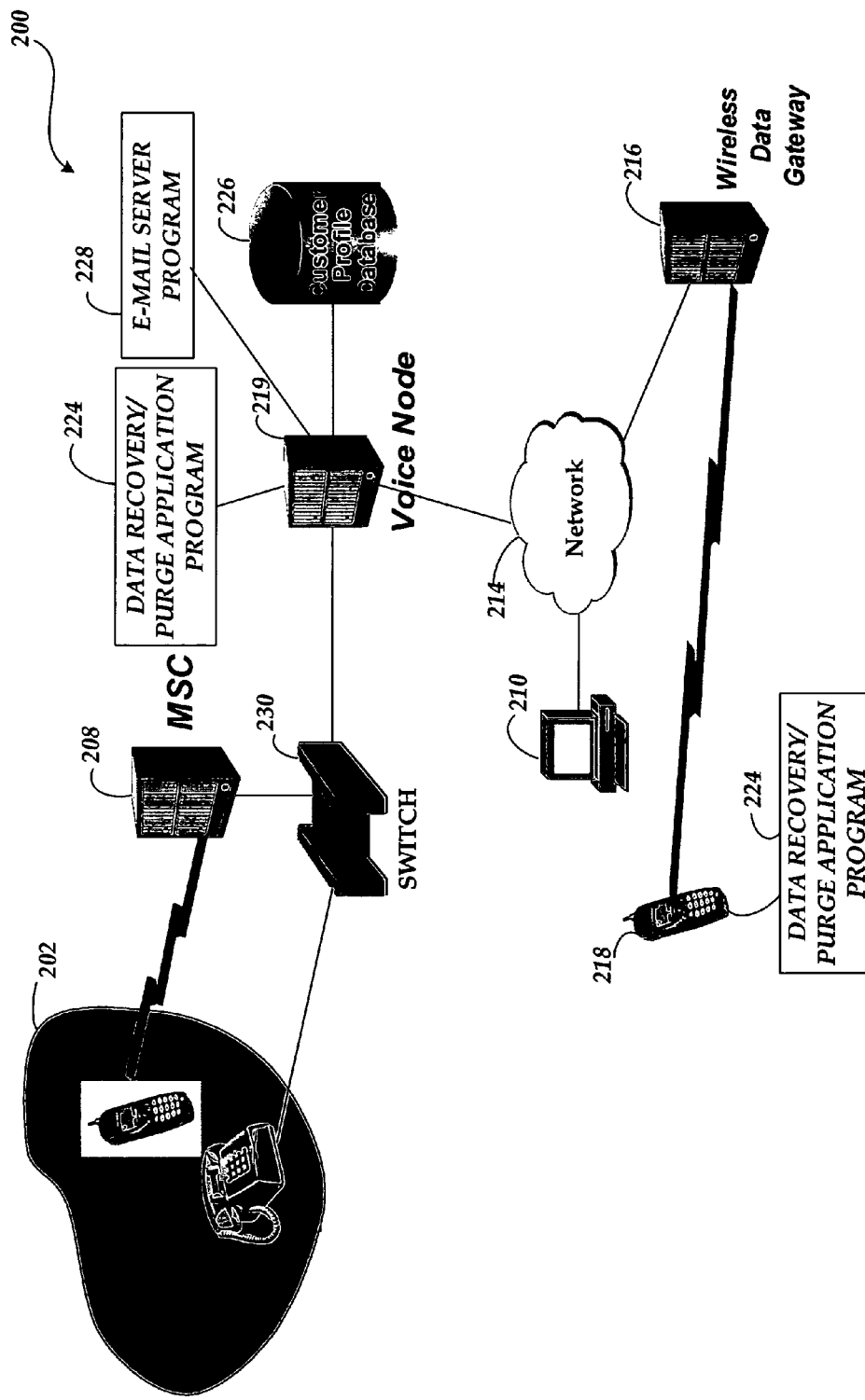
FIG. 2 is a network diagram illustrating aspects of a voice communications network.

Systems and methods for remotely recovering data from a wireless device, purging data from the wireless device, and alerting a wireless device may be provided. A data message containing instructions for recovering/purging data stored on the device may be sent to the wireless device. The data message may be received by a recovery/purge application resident on the wireless device. FIGS. 1 and 2 and the corresponding discussion are intended to provide a brief, general description of a suitable communications network environment consistent with embodiments of the invention.

Referring now to FIG. 1, a data communications network for performing embodiments of the invention will be described. As shown in FIG. 1, a communications network 100 includes communications devices 102 for sending and receiving data over a network 114. Communications devices 102 include, for example, a wireless hand-held computer 104 and a personal computer 106. According to embodiments of the invention, wireless hand-held computer 104 utilizes a wireless data gateway 108 to send and receive data messages over the network 114. As will be described in greater detail below, communications devices 102 may be utilized to send data messages over network 114 to recover and/or purge messages from lost or stolen devices in communications network 100. The data messages may include, for instance, electronic mail ("e-mail") messages, short message service ("SMS") messages, text messages, or any other message types that may be communicated in a communications network. Embodiments of the invention are not limited to hand-held computer 104 or personal computer 106, but may be practiced with other communications devices including, but not limited to, two-way paging devices, voice over Internet protocol ("VOIP") or Internet telephones, microprocessor-based or programmable consumer electronics, minicomputers, mainframe computers, and the like.

Network 114 interconnects communications devices 102 with a network server computer 112 for managing data traffic and a web server computer 126 for delivering web pages to connected devices over the network 114. Network 114 may include any type of computing network, including a local area network or a wide area network, such as the Internet. Network 114 provides a medium for enabling communication between communications devices 102, server computers 112 and 126, a computer 110, and a wireless device 118.

Wireless device 118 may be a hand-held computer. Wireless device 118 sends and receives data messages over the network 114 through communication with wireless data gateways 108 and 116. Wireless data gateways 108 and 116 convert data communicated over a wireless data network (not shown) so that it may be communicated over network 114.

Consistent with embodiments of the invention, wireless device 118 may further include "smart phone" functionality. Smart phones combine the functions of a conventional mobile phone with functionality typically included in a personal or hand-held computer. This functionality includes the capability of saving data, executing software programs, sending and receiving e-mail and instant messages, and accessing Web pages over the Internet.

Wireless device 118 is operative to execute a data recovery/purge application 124. According to illustrative embodiments of the invention, data recovery/purge application 124 may be utilized to recover and/or purge saved data from wireless device 118, e.g., upon the device becoming lost or stolen. Data recovery/purge application 124 may be executed or invoked upon receiving a message from either of the communications devices 102. The message may contain request data for identifying a lost wireless device, recovering the saved data, purging the saved data, recovering and then purging the saved data, alerting wireless device 118 or other instructions. The request data may also contain a return address, such as an e-mail address, for sending the recovered data and/or confirmation of a data purge to wireless devices 102 or to computer 110. The functions of data recovery/purge application 124 will be discussed in greater detail below with reference to FIGS. 3 and 4.

Referring now to FIG. 2, a voice communications network for performing embodiments of the invention will be described. As shown in FIG. 2, a communications network 200 includes communications devices 202 for conducting voice and data communications with a switch 230. Communications devices 202 may include a standard wireline telephone set 206 which is connected via a subscriber line to switch 230. Communications devices 202 also include a wireless telephone 204 that is in wireless communication with a mobile switching center ("MSC") 208. MSC 208 may be utilized to communicate the wireless voice traffic from mobile telephone 204 to switch 230 via a wireline connection. Switch 230, MSC 208 and the connections between them and communications devices 202 may be components in a typical public switched telephone network ("PSTN"). According to embodiments of the invention, switch 230 may be a standard central office circuit switch or a softswitch for routing voice and data traffic in the PSTN.

Communications network 200 also includes a voice node 219 in communication with switch 230 and a customer profile database 226. According to embodiments of the invention, voice node 219 may be a server computer with interactive voice response ("IVR") functionality. For instance, a customer may utilize an IVR to retrieve up-to-date account information from a bank by entering his or her account number on a touch-tone telephone keypad in response to a synthesized voice recording. The IVR will then access a database associated with the bank and retrieve account information associated with the customer's account number. The account information may then be presented to the customer over the telephone via a synthesized voice generated by the IVR.

Communications network 200 also includes a network 214. Network 214 provides a medium for enabling communication between voice node 219, a computer 210, and wireless device 218. The communication with wireless device 218 may be enabled through a wireless data gateway 216 that converts data communicated over network 214 so that it is compatible with a wireless data network (not shown) in communication with wireless device 218. Network 214 may include any type of computing network, including a local area network or a wide area network, such as the Internet.

Voice node 219 is operative to execute a data recovery/purge application program 224 and an e-mail server program 228. According to embodiments of the invention, voice node 219 may be utilized to receive a voice call to a special directory number from switch 230 for locating a lost or stolen wireless device in communications network 200. Data recovery/purge application 224 may be executed or invoked upon voice node 219 retrieving information from database 226 associated with a wireless directory number for the lost or stolen wireless device. Data recovery/purge application 224 may receive this information and compose a message to send to e-mail server program 228 that then sends the message over network 214 to a copy of data recovery/purge application 224 executed on wireless device 218. As previously discussed with respect to wireless device 118 in the description of FIG. 1, wireless device 218 may include smart phone functionality to enable the execution of data recovery/purge application 224 as well as other software application programs.

The message may contain request data for identifying the wireless device, recovering data saved on the wireless devices, purging the saved data, recovering and then purging the saved data, or other instructions. The request data may also contain a return address, such as an e-mail address, for sending the recovered data and/or confirmation of a data purge to computer 210. The functions of data recovery/purge application 224 in communications network 200 will be discussed in greater detail below with reference to FIGS. 4A and 4B.

Figure 3A:
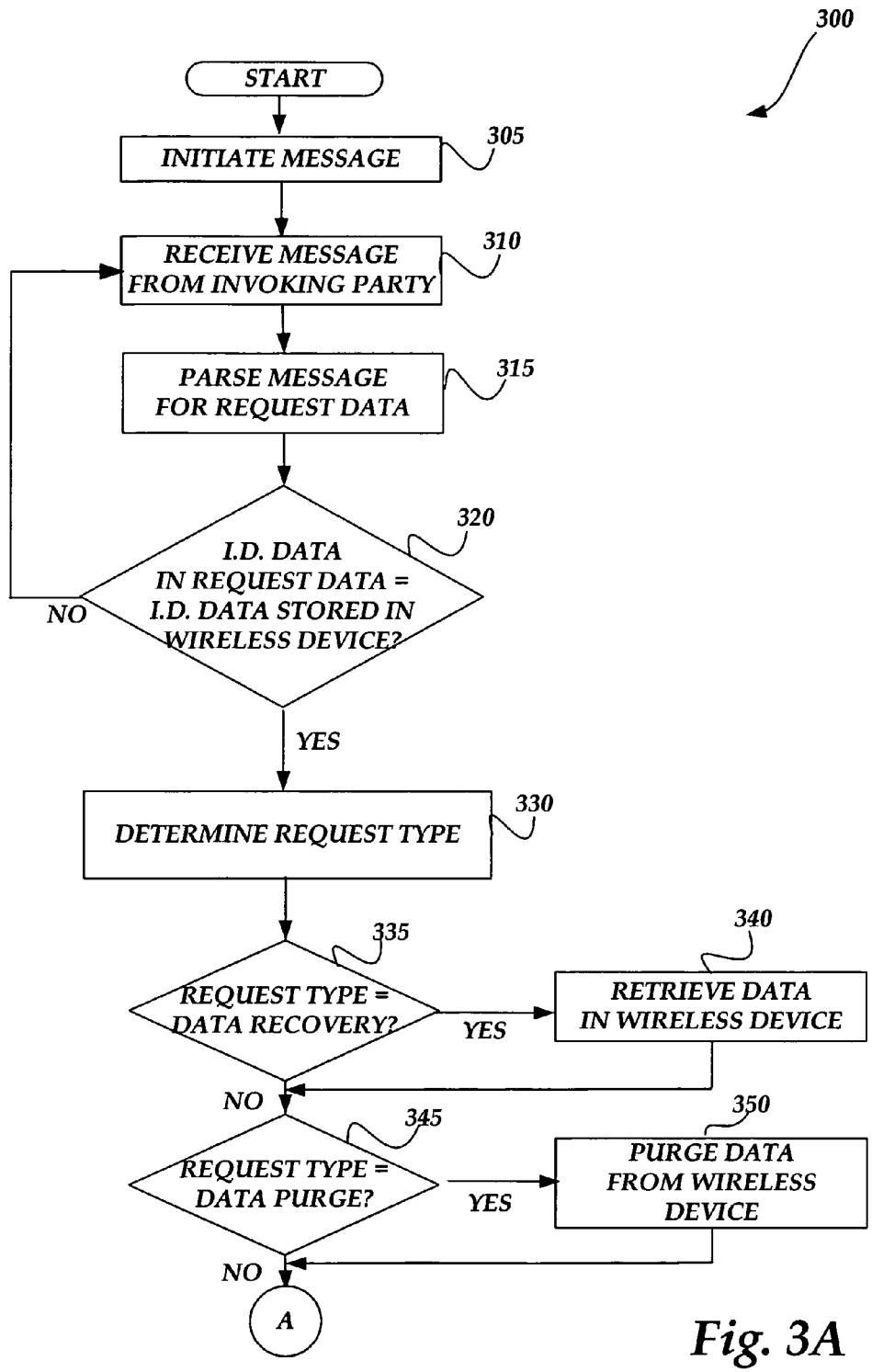
FIG. 3A is a flow diagram illustrating aspects of a process for recovering data, purging data, and performing other operations with respect to a wireless device in the data communications network of FIG. 1.

Referring now to FIG. 3A, a routine 300 will be described illustrating a process that may be performed by data recovery/purge application 124 for recovering data, purging data, and alerting wireless device 118 performing other operations with respect to wireless device 118 in communications network 100, discussed above. The logical operations of various embodiments of the present invention may be implemented (1) as a sequence of computer implemented acts or program modules running on a computing system and/or (2) as interconnected machine logic circuits or circuit modules within the computing system. Accordingly, the logical operations illustrated in FIGS. 3A-4B, and making up the embodiments of the present invention described herein are referred to variously as operations, structural devices, acts, or modules. These operations, structural devices, acts, and modules may be implemented in software, in firmware, in special purpose digital logic, and any combination thereof.

Routine 300 begins at operation 305, wherein a user/invoking party of communications devices 102 initiates a message to execute data recovery/purge application 124 resident in wireless device 118. In particular, an invoking party in communications network 100 may initiate a message by sending an e-mail message from hand-held computer 104 or the computer 106 directly to wireless device 118 over network 114. The e-mail message may include a form comprising a number of fields of request data which are parsed by data recovery/purge application 124 upon receipt of the message. The request data fields may include a key field indicating a unique identification (such as the wireless telephone number) of the wireless device being contacted, a request type field indicating the type of operation to be performed by recovery/data purge application 124, and a data recovery address which may be an e-mail address for sending recovered data, a purge confirmation, or other data to the invoking party. The message is not limited to an e-mail message but may also take the form of wireless text messages such as SMS messages in addition to various other types of wireless and wireline messaging known.

From operation 305, routine 300 continues to operation 310 where the message from the invoking party is received at wireless device 118 at which time data recovery/purge application 124 is executed. For instance, wireless device 118 may be preconfigured (i.e., preprogrammed) to automatically execute data recovery/purge application 124 each time an e-mail message is received. Once executed data recovery/purge application 124 determines if the received message includes request data as described in detail at operation 315.

From operation 310, routine 300 continues to operation 315 where data recovery/purge application 124 parses the received message from the invoking party for request data indicating a request to recover data, purge data, or to perform other operations with respect to wireless device 118. In particular, recovery/purge application 124 may be configured to search for request data fields in an e-mail message sent by the invoking party. For instance, recovery/purge application 124 may initially search for the key field to confirm that the request data in the message is applicable to wireless device 118.

From operation 315, routine 300 continues to operation 320 where data recovery/purge application 124 compares identification information in the request data to identification data previously stored in wireless device 118. In particular, recovery/purge application 124 may search for an identification number in the key field in the request data. The identification number may include, for instance, the wireless telephone number of wireless device 118.

If, at operation 320, recovery/purge application 124 determines that the identification data does not match the identification data stored in wireless device 118, routine 300 branches to operation 310 where recovery/purge application 124 waits to receive another message from the invoking party. Upon determining a non-match of the identification data, recovery/purge application 124 may further be configured to generate an alert in a return message to the invoking party indicating that the sent identification data does not match the identification data in the wireless device 118.

If, at operation 320, recovery/purge application 124 determines that the identification data matches the identification data stored in wireless device 118, routine 300 continues to operation 330. At operation 330, recovery/purge application 124 determines the type of request contained in the request data in the received message from the invoking party. For instance, recovery/purge application 124 may search a request type field in the received message to identify whether a request was made to recover personal contact data stored in wireless device 118. It should be noted that multiple types of requests can be requested. For example, the request data can indicate that Lock, Locate, and Alert, or any like combination of more than one of the types of request described herein and in FIGS. 3A, 3B, 4A and 4B.

From operation 330, routine 300 continues to operation 335 where data recovery/purge application 124 determines whether the request data includes a request to recover the data stored in wireless device 118. If the request data includes a request to recover the data stored in wireless device 118, routine 300 continues to operation 340 where data recovery/purge application 124 retrieves the data stored in wireless device 118. In particular, data recovery/purge application 124 may access the memory in wireless device 118 and initiate commands to make a copy of the stored data. For instance, data recovery/purge application 124 may be configured to copy a user's personal data, such as telephone and address data, calendar information, passwords, and account numbers from wireless device 118 into a data file. Routine 300 then continues to operation 345.

If, at operation 335, recovery/purge application 124 determines that the request data does not include a request to recover the data stored in wireless device 118, routine 300 continues to operation 345 where recovery/purge application 124 determines whether the request data includes a request to purge the data stored in wireless device 118. If the request data includes a request to purge the data stored in wireless device 118, routine 300 continues to operation 350 where recovery/purge application 124 purges data stored in wireless device 118. In particular, data recovery/purge application 124 may execute a delete command from a menu in wireless device 118 to purge the stored data. Routine 300 then continues to off-page connector A where routine 300 continues in FIG. 3B. If, at operation 335, recovery/purge application 124 determines that the request data does not include a request to purge the data stored in wireless device 118, routine 300 continues to off-page connector A where routine 300 continues in FIG. 3B.

Figure 3B:
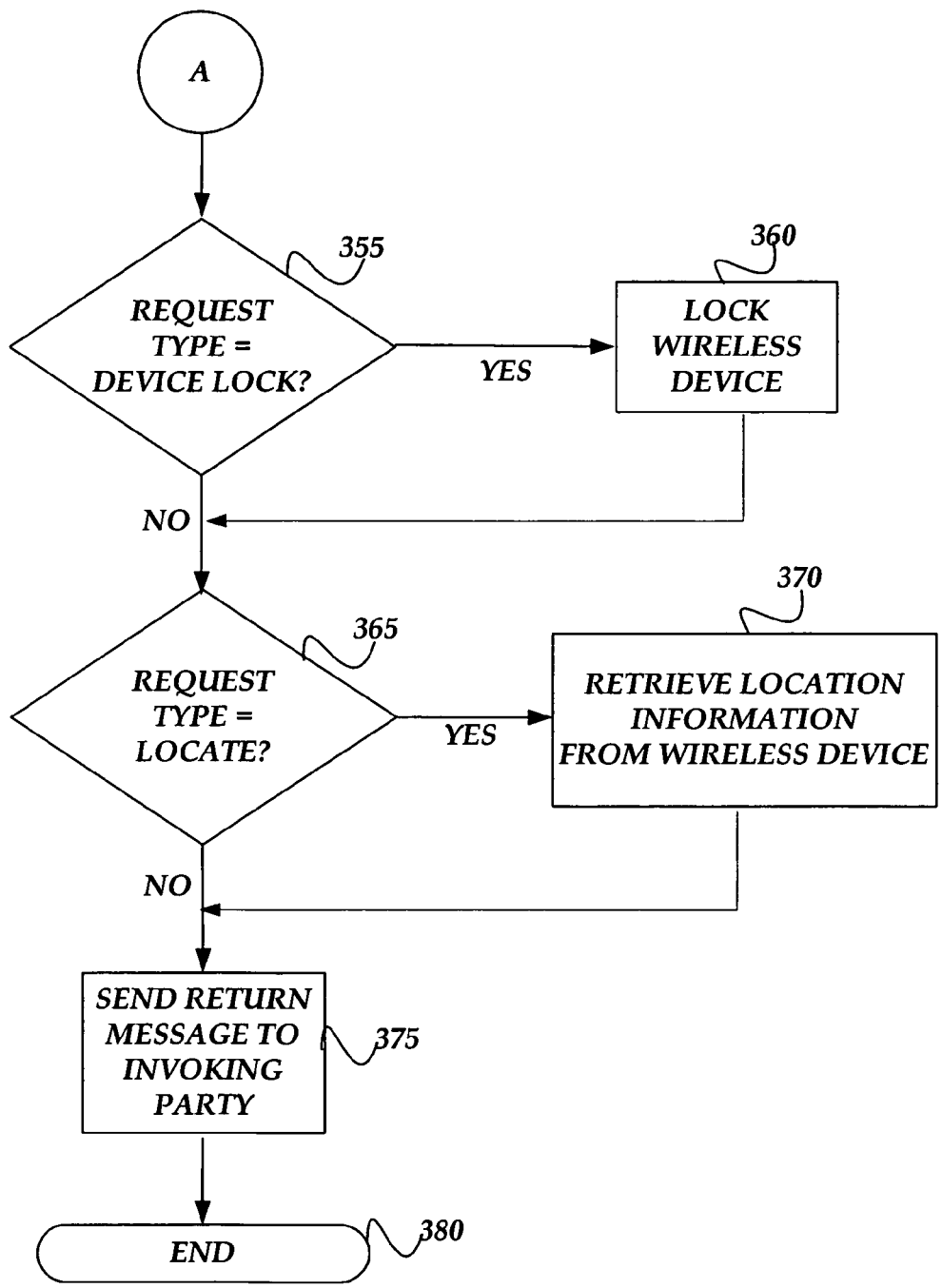
FIG. 3B is a flow diagram continuing the process of FIG. 3A.

Referring now to FIG. 3B, routine 300 continues from off-page connector A to operation 355 where data recovery/purge application 124 determines whether the request data includes a request to lock wireless device 118. If the request data includes a request to lock wireless device 118, routine 300 continues to operation 360 where data recovery/purge application 124 locks wireless device 118. In particular, data recovery/purge application 124 may access a menu in wireless device 118 and enter a numerical code, provided by the invoking party in the request data, to lock the device so that device functions and data are prevented from being accessed by an unknown party. Routine 300 then continues to operation 365.

If the request data does not include a request to lock the wireless device 118, routine 300 continues to operation 365 where data recovery/purge application 124 determines whether the request data includes a request to locate wireless device 118. If the request data includes a request to locate wireless device 118, routine 300 continues to operation 370 where data recovery/purge application 124 executing on wireless device 118 retrieves location information. In particular, data recovery/purge application 124, in response to receiving a request for location information, may be configured to access a menu in wireless device 118 to retrieve location data such as Global Positioning System ("GPS") data (if the wireless device 118 includes this feature). Routine 300 then continues to operation 375.

If the request data does not include a request to lock wireless device 118, routine 300 continues to operation 375 where data recovery/purge application 124 sends a return message to the invoking party. In particular, data recovery/purge application 124 may initiate and send an e-mail message from wireless device 118 over network 114 to a data recovery address or addresses specified in the request data sent by the invoking party. The return address may be a different address than the one from which the request data was sent by the invoking party. For instance, the invoking party may have initiated a recovery and purge request from computer 106 (which may be a home computer) but may wish the recovered data to be sent to an e-mail address associated with the computer 110 (which may be a work computer). In addition, the return message may be sent to multiple addresses.

The return message may include the recovered data file as an attachment and an acknowledgement confirming that data was recovered and/or purged from wireless device 118. In one illustrative embodiment, data recovery/purge application 124 may be configured to retry a data recovery or purge request until successful. The return message may also include other information requested by the invoking party such as a confirmation that wireless device 118 was locked or current location information for wireless device 118. From operation 375, routine 300 continues to operation 380, where it ends.

Figure 4A:
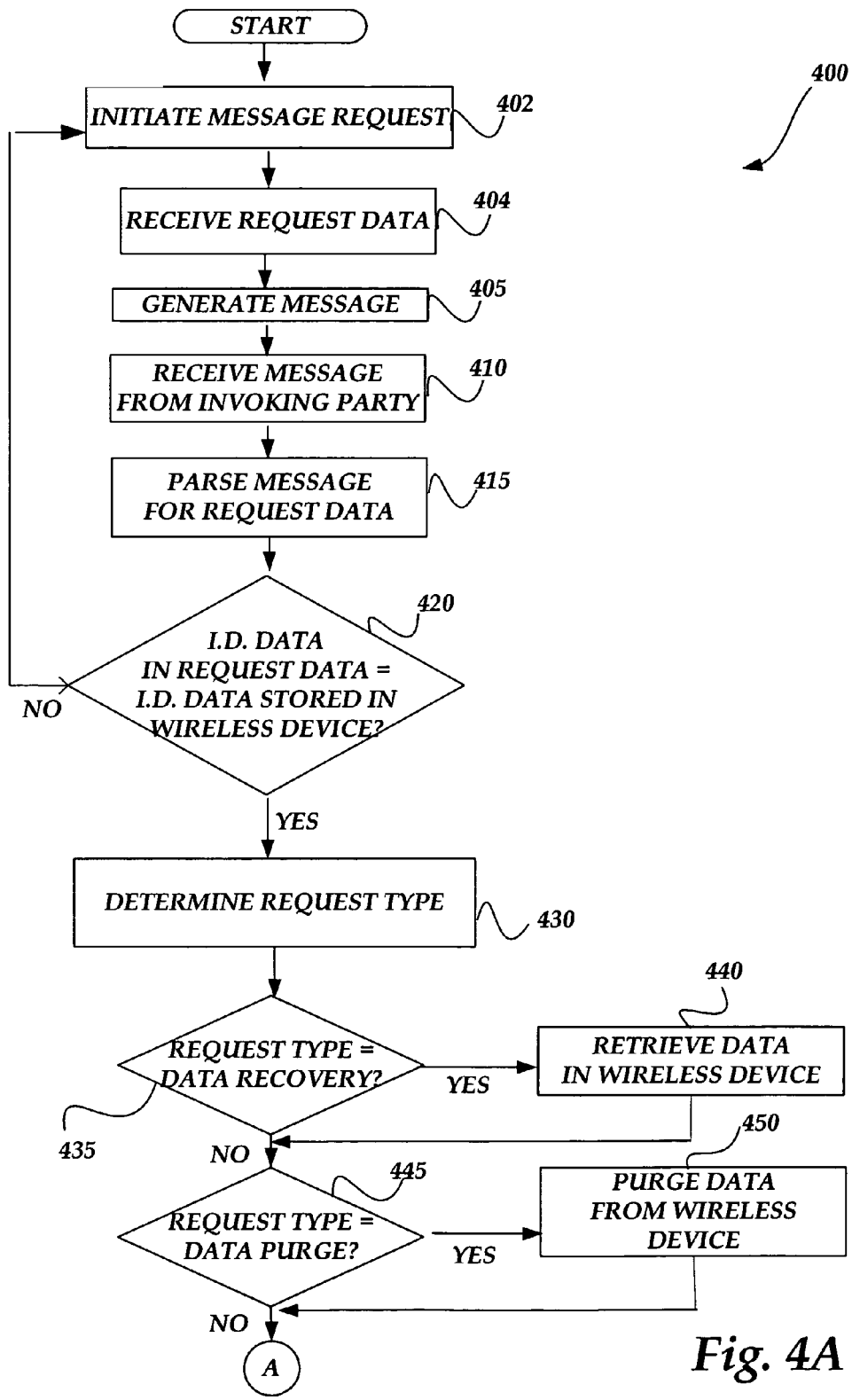
FIG. 4A is a flow diagram illustrating aspects of a process for recovering data, purging data, and performing other operations with respect to a wireless device in the voice communications network of FIG. 2.

Turning now to FIG. 4A, a routine 400 will be described illustrating a process that may be performed by data recovery/purge application 224 for recovering data, purging data, and performing other operations with respect to wireless devices 218 in communications network 200, discussed above. Routine 400 begins at operation 402, wherein a user/invoking party of communications devices 202 initiates a message request to execute data recovery/purge application 224 resident in wireless device 218. In particular, an invoking party in communications network 200 may initiate a message request by making a voice call to voice node 219. Upon the completion of the call, voice node 219 may generate synthesized voice prompts requesting the telephone number of wireless device 218 and the type of request or requests (e.g., data recovery, data purge, device lock, or device location). Once this information is received, voice node 219 accesses database 226 to retrieve profile information which may include identification data associated with wireless device 218 and a return address to be included in request data received by data recovery/purge application 224.

From operation 402, routine 400 continues to operation 404 where voice node 219 executes data recovery/purge application 224 that receives the request data stored in the database and provided by the invoking party. In particular, data recovery/purge application 224 receives the identification data, the return address, and the request type (or types) for generating a message to send to wireless device 218.

From operation 404, routine 400 continues to operation 405 where recovery/purge application 224 executing in voice node 219 generates a message to execute data recovery/purge application 224 resident in wireless device 218. In particular, data recovery/purge application 224 in the voice node may generate an e-mail message that e-mail server program 228 sends directly to wireless device 218 over network 214. As discussed above in the description of FIG. 3A, the e-mail message may include a form comprising a number of fields of request data including a key field indicating a unique identification (such as the wireless telephone number) of the wireless device being contacted, a request type field indicating the type of operation to be performed by recovery/data purge application 224 resident in wireless device 218, and a data recovery address which may be an e-mail address for sending recovered data, a purge confirmation, or other data to the invoking party. Alternatively, the message may also take the form of a wireless text message such as an SMS messages in addition to various other types of wireless and wireline messaging known to those skilled in the art.

From operation 405, routine 400 continues to operation 410 where the message from the invoking party is received at the wireless device 218 at which time data recovery/purge application 224 resident in wireless device 218 is executed. For instance, wireless device 218 may be preconfigured (i.e., preprogrammed) to automatically execute data recovery/purge application 224 each time an e-mail message is received. Once executed data recovery/purge application 224 determines if the received message includes request data as described in detail at operation 415.

From operation 410, routine 400 continues to operation 415 where data recovery/purge application 224 parses the received message from the invoking party for request data indicating a request to recover data, purge data, or to perform other operations with respect to wireless device 218. In particular, recovery/purge application 224 may be configured to search for request data fields in an e-mail message. For instance, recovery/purge application 224 may initially search for the key field to confirm that the request data in the message is applicable to wireless telephone device 218.

From operation 415, routine 400 continues to operation 420 where data recovery/purge application 224 compares identification information in the request data to identification data previously stored in wireless device 218. In particular, recovery/purge application 224 may search for an identification number in the key field in the request data. The identification number may include, for instance, the wireless telephone number of wireless device 218.

If, at operation 420, recovery/purge application 224 determines that the identification data does not match the identification data stored in wireless device 218, routine 400 branches to operation 410 where recovery/purge application 224 waits to receive another message. Upon determining a non-match of the identification data, recovery/purge application 224 may further be configured to generate an alert in a return message to computer 210 associated with the invoking party indicating that the sent identification data does not match the identification data in wireless device 218.

If, at operation 420, recovery/purge application 224 determines that the identification data matches the identification data stored in wireless device 218, routine 400 continues to operation 430. At operation 430, recovery/purge application 224 determines the type of request contained in the request data in the received message from the invoking party. For instance, recovery/purge application 224 may search a request type field in the received message to identify whether a request was made to recover personal contact data stored in wireless device 218.

From operation 430, routine 400 continues to operation 435 where data recovery/purge application 224 determines whether the request data includes a request to recover the data stored in wireless device 218. If the request data includes a request to recover the data stored in wireless device 218, routine 400 continues to operation 440 where data recovery/purge application 224 retrieves data stored in the wireless device 218. In particular, data recovery/purge application 224 may access the memory in wireless device 218 and initiate commands to make a copy of the stored data. For instance, data recovery/purge application 224 may be configured to copy a user's personal data, such as telephone and address data, calendar information, passwords, and account numbers from wireless device 218 into a data file. Routine 400 then continues to operation 445.

If, at operation 435, recovery/purge application 224 determines that the request data does not include a request to recover the data stored in wireless device 218, routine 400 continues to operation 445 where recovery/purge application 224 determines whether the request data includes a request to purge the data stored in wireless device 218. If the request data includes a request to purge the data stored in wireless device 218, routine 400 continues to operation 450 where recovery/purge application 224 purges data stored in wireless device 218. In particular, data recovery/purge application 224 may execute a delete command from a menu in wireless device 218 to purge the stored data. Routine 400 then continues to off-page connector A where the routine 400 continues in FIG. 4B. If, at operation 435, recovery/purge application 224 determines that the request data does not include a request to purge the data stored in wireless device 218, routine 400 continues to off-page connector A where routine 400 continues in FIG. 4B.

Figure 4B:
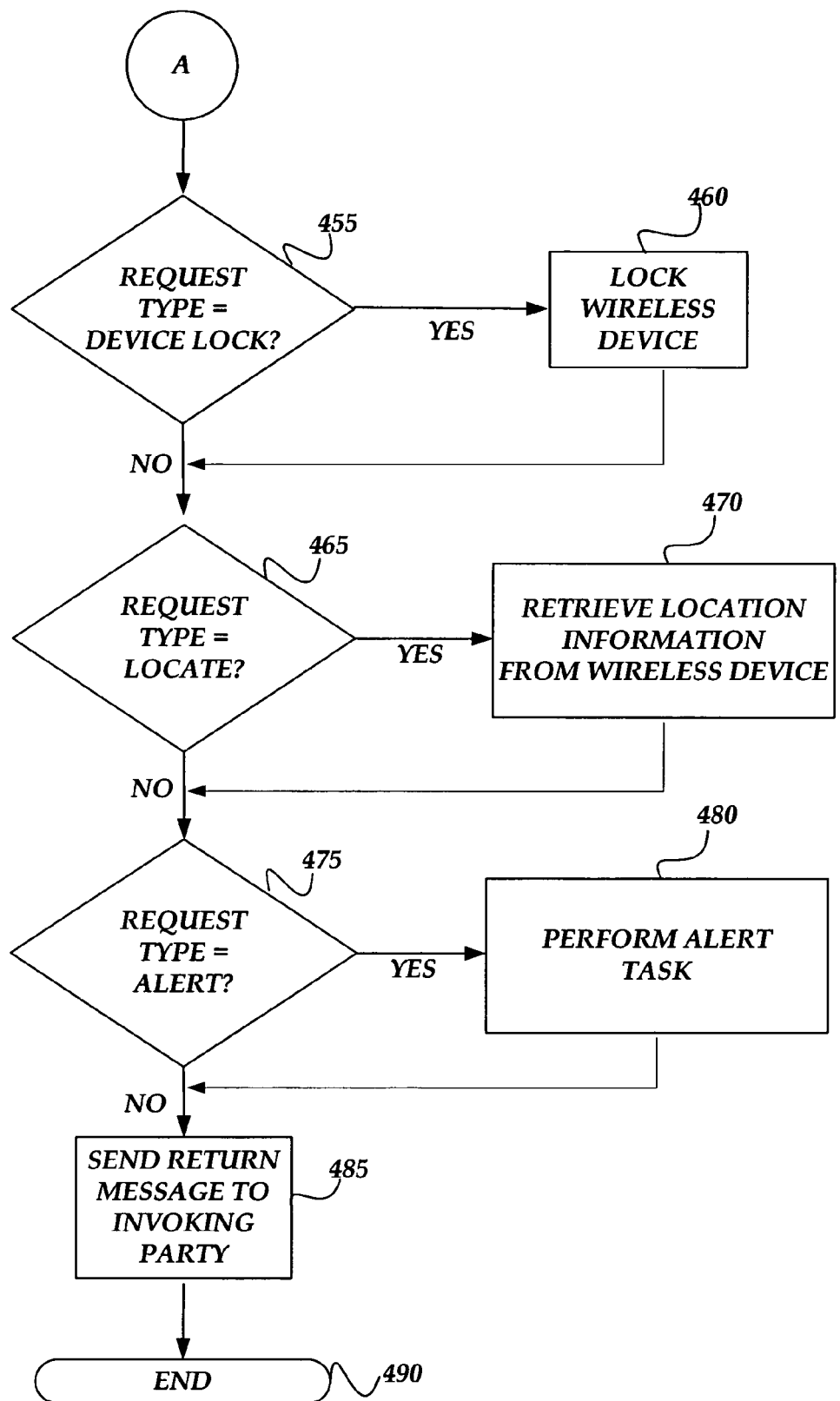
FIG. 4B is a flow diagram continuing the process of FIG. 4A.

Referring now to FIG. 4B, routine 400 continues from off-page connector A to operation 455 where data recovery/purge application 224 determines whether the request data includes a request to lock wireless device 218. If the request data includes a request to lock wireless device 218, routine 400 continues to operation 460 where data recovery/purge application 224 locks wireless device 218. In particular, data recovery/purge application 224 may access a menu in wireless device 218 and enter a numerical code, provided by the invoking party in the request data, to lock the device so that device functions and data are prevented from being accessed by an unknown party. Routine 400 then continues to operation 465.

If the request data does not include a request to lock the wireless device 218, routine 400 continues to operation 465 where data recovery/purge application 224 determines whether the request data includes a request to locate wireless device 218. If the request data includes a request to locate the wireless device 218, routine 400 continues to operation 470 where data recovery/purge application 224 executing on wireless device 218 retrieves location information. In particular, data recovery/purge application 224, in response to receiving a request for location information, may be configured to access a menu in wireless device 218 to retrieve location data, such as Global Positioning System ("GPS") data (if the wireless device 218 includes this feature).

If the request data does not include a request to locate wireless device 218, routine 400 continues to operation 475 where data recovery/purge application 224 determines whether the request data includes a request to perform an alert task via wireless device 218. If the request data includes a request to perform an alert task via wireless device 218, routine 400 continues to operation 480 where data recovery/purge application 224 executing on wireless device 218 causes wireless device 218 to perform a function configured to indicate to a subject that wireless device 218 has been lost. In particular, data recovery/purge application 224, in response to receiving an alert request, may be configured to cause wireless device 218 to produce a visible alert on wireless device 218. For example, in response to data recovery/purge application 224, wireless device 218 may flash a light on wireless device 218. The flashing may be in some distinguishable sequence of on/off time segments or may be a distinguishable light color. The visible alert may be displayed via any visible component enabled by device 218. For example, if device 218 includes a display screen, the alert may be produced by a display presented for visual viewing on the screen. In other words the visible alert on wireless device 218 flashing may indicate to the subject (e.g., a person who may have noticed or found wireless device 218) that wireless device 218 is considered lost or mislaid by its owner. The visible alert may be presented in any manner to indicate that wireless device 218 is considered lost by its owner.

Moreover, data recovery/purge application 224, in response to receiving the alert request, may be configured to cause wireless device 218 to emit an audible alert (e.g. a tone) from wireless device 218. The audible alert may be loaded into wireless device 218 in the same way that a ring tone or other audible alert is loaded. For example, the audible alert may be pre-established on wireless device 218 prior to wireless device 218 being alerted, provided to wireless device 218 when wireless device 218 is alerted, or provided to wireless device 218 after wireless device 218 is alerted. In other words, the type of audible alert to be sounded in response to the alert request may be pre-established and pre-loaded into wireless device 218. In other embodiments of the invention, the type of audible alert to be sounded in response to the alert request may be received with the alert request or subsequent to receiving the alert request. Like the visible alert and audible alert, the alert may also be presented in the form of a motion alert produced by the device, for example, a vibration.

Furthermore, data recovery/purge application 224, in response to receiving an alert request, may be configured to cause wireless device 218 to display a message on wireless device 218. Like the aforementioned audible alert, the displayed message may be pre-established on wireless device 218 prior to wireless device 218 being alerted, provided to wireless device 218 when wireless device 218 is alerted, or provided to wireless device 218 after the wireless is alerted. In other words, the message to be displayed in response to the alert request may be pre-established and pre-loaded into wireless device 218. In other embodiments, the message to be displayed in response to the alert request may be received with the alert request or subsequent to receiving the alert request. The message may comprise, for example, information configured to let a subject finding wireless device 218 know that wireless device 218 is lost and may provide directions on how to return wireless device 218. The directions may include a location to mail or ship wireless device 218. The directions may include a telephone number to call or other contact information in order to report finding wireless device 218 and to receive further instructions for returning wireless device 218 to its owner. In addition, the message may provide an address in a display on the wireless device 218 and instructions to drop wireless device 218 in a mail box or take it to a delivery provider. In this way, the device may be returned to the owner (e.g. though a third party) in which wireless device 218's owner or the third party or both may pay the cost for returning wireless device 218.

In addition, data recovery/purge application 224, in response to receiving an alert request, may be configured to cause wireless device 218 to emit an audible message on wireless device 218. Like the aforementioned audible alert and displayed message, the audible message may be pre-established on wireless device 218 prior to wireless device 218 being alerted, provided to wireless device 218 when wireless device 218 is alerted, or provided to wireless device 218 after the wireless device is alerted. In other words, the audible message to be sounded in response to the alert request may be pre-established and pre-loaded into wireless device 218. In other embodiments, the audible message to be sounded in response to the alert request may be received with the alert request or subsequent to receiving the alert request. The audible message may comprise, for example, the same information as described above with respect to the aforementioned displayed message and could be presented over a speaker on wireless device 218 as either a recorded audio file or via text-to speech translation of a text message.

Also, data recovery/purge application 224, in response to receiving an alert request, may be configured to cause wireless device 218 to transmit location information corresponding to a location of wireless device 218. For example, the location information may comprise GPS coordinates of wireless device 218. In this way, if the owner of wireless device 218 receives the GPS coordinates, the owner may be able to go to those coordinates to recover lost wireless device 218. In other embodiments, the GPS coordinates of wireless device 218 may be sent to a server that may be configured to display to wireless device 218's owner a map indicating wireless device 218's location on the map based on the aforementioned GPS coordinates. The map may be presented to wireless device 218's owner via a computer network, for example, the Internet.

Once alerted, wireless device 218 may be caused to be operable to call a limited number of telephone numbers. In addition, wireless device 218 may be caused to indicate the limited number of telephone numbers. The limited number of telephone number may correspond to subjects or service providers capable of providing information to wireless device 218's finder for returning wireless device 218. For example, wireless device 218 may either audibly emit or visibly display a message stating "press 1 to call this telephone's owner." Furthermore, wireless device 218 may either audibly emit or display a message stating "press 2 to receive data to help return this telephone to its owner." The aforementioned are examples, and other messages may be sounded or displayed by wireless device 218 directed to help a subject finding wireless device 218 to call one of the aforementioned limited number of telephone numbers. It is noted that the presentation of this information may be in such a way as to preserve the anonymity of the owner of the device. That is, when the subject finding wireless device 218 responds to the alert by, for example, pressing "1" to call the owner of the device, the result is that wireless device 218 invokes a telephony application, retrieves a number to dial associated with the owner, and places a telephony call from wireless device 218 to the number retrieved, without requiring the display, at any time, of the number being dialed or any other identifying information related to the owner of wireless device 218. Similarly, other types of communications can be used to send a communication from wireless device 218 to a communication address for the owner and may likewise maintain the anonymity of the owner if desired. These may include email, instant messaging, or any other type of communication application supported by wireless device 218. In enabling only specific addressable telephone numbers or other addresses, the utility of wireless device 218 may be limited to communication only for the purpose of aiding in the return wireless device 218 to its owner. All other communications may be disabled when this feature is invoked. Any one or more of the aforementioned functions configured to indicate to a subject that wireless device 218 has been lost may be performed alone or in combination with any other one or more of the aforementioned functions. The routine 400 then continues to operation 485.

If the request data does not include a request to lock wireless device 218, routine 400 continues to operation 485 where data recovery/purge application 224 sends a return message to the invoking party. In particular, data recovery/purge application 224 may initiate and send an e-mail message from wireless device 218 over network 214 to the data recovery address linked to invoking party in the database 226. The return message may be sent to multiple addresses.

The return message may include the recovered data file as an attachment and an acknowledgement confirming that data was recovered and/or purged from wireless device 218. Consistent with embodiments of the invention, data recovery/purge application 224 may be configured to retry a data recovery or purge request until successful. The return message may also include other information requested by the invoking party such as a confirmation that wireless device 218 was locked or current location information for wireless device 218. From operation 485, routine 400 continues to operation 490, where it ends.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for alerting a wireless device, the method comprising:
   receiving an alert request message from an invoking party at a network node;
   parsing the alert request message for request data;
   determining a type of alert being indicated by the request data;
   and, in response to the determined type of alert, providing an alert performance message corresponding to the determined type to the wireless device,
   causing the wireless device using the alert performance message to execute an application on the wireless device to indicate to a subject that the wireless device has been lost or stolen,
   upon executing the application, displaying a visible alert on the screen of the wireless device and emitting an audible message from the wireless device,
   wherein displaying the visible alert by flashing a visible alert on a screen of the wireless device indicating the wireless device is lost or stolen,
   and emitting the audible message by audibly stating in a verbal message that the wireless device is lost or stolen,
   wherein emitting the audible message further comprises receiving the audible message at the wireless device from the network node after the alert performance message, and
   delivering the audible message to the wireless device in the form of one of a recorded audio file and a text message, and
   converting the text message to the audible message using a text-to speech translation of the text message.

2. The method of claim 1, wherein the alert performance message causes the wireless device to indicate an audible alert.

3. The method of claim 2, wherein the audible alert further comprises a motion alert produced by the wireless device.

4. The method of claim 1, wherein the alert performance message causes the wireless device to displaying a message.

5. The method of claim 1, wherein the alert performance message causes the wireless device to display a message, the message being one of the following: pre-established on the wireless device prior to providing the alert performance message, provided to the wireless device when the wireless is provided with the alert performance message, and provided to the wireless device after providing the alert performance message.

6. The method of claim 1, wherein the alert performance message causes the wireless device to transmit location information corresponding to a location of the wireless device.

7. The method of claim 1, wherein the alert performance message causes the wireless device to be operable to initiate a communication to a limited number of communication addresses and to provide a prompt to initiate a communication to at least one of the limited number of communication addresses.

8. The method of claim 1, wherein the invoking party initiates the request message by making a voice call to a voice node in a network.

9. A method for alerting a wireless device, the method comprising:
   receiving an alert performance message at the wireless device, wherein receiving the alert performance message is in response to an alert type received at a network node,
   causing the wireless device using the alert performance message to perform a function to indicate to a subject that the wireless device has been lost,
   performing the function further includes displaying a visible alert on the screen of the wireless device and emitting an audible message from the wireless device,
   wherein displaying the visible alert by flashing a visible alert on a screen of the wireless device indicating the wireless device is lost or stolen,
   and emitting the audible message by stating in a verbal message that the wireless device is lost or stolen,
   wherein emitting the audible message further comprises receiving the audible message by the wireless device after receiving the alert performance message, and
   delivering the audible message to the wireless device in the form of one of a recorded audio file and a text message, and converting the text message to the audible message using a text-to speech translation of the text message.

10. The method of claim 9, wherein the alert performance message causes the wireless device to perform the function to indicate to the subject that the wireless device has been lost wherein the function to indicate further comprises the wireless device emitting an audible tone from the wireless device based upon the received alert performance message.

11. The method of claim 9, wherein the alert performance message causes the wireless device to perform the function to indicate to the subject that the wireless device has been lost wherein the function to indicate further comprises the wireless device displaying a message on the wireless device based upon the received alert performance message.

12. A tangible computer-readable medium which stores a set of instructions which when executed performs a method for alerting a wireless device, the method executed by the set of instructions comprising:

receiving an alert performance message at the wireless device, wherein receiving the alert performance massage is in response to an alert type received at a network node, causing the wireless device using the alert performance message to perform a function to indicate to a subject that the wireless device has been lost, performing the function further includes displaying a visible alert on the screen of the wireless device and emitting an audible message from the wireless device, wherein displaying the visible alert by flashing a visible alert on a screen of the wireless device indicating the wireless device is lost or stolen, and emitting the audible message by stating in a verbal message that the wireless device is lost or stolen, wherein emitting the audible message further comprises receiving the audible message by the wireless device after receiving the alert performance message, and delivering the audible message to the wireless device in the form of one of a recorded audio file and a text message, and converting the text message to the audible message using a text-to speech translation of the text message.

13. The tangible computer-readable medium of claim 12, wherein the function to indicate further comprises the wireless device emitting an audible tone from the wireless device based upon the received alert performance message.

* * * * *